United States Patent
Keng et al.

(10) Patent No.: US 7,352,904 B2
(45) Date of Patent: Apr. 1, 2008

(54) BLOCK DECODING METHOD AND SYSTEM CAPABLE OF DECODING AND OUTPUTTING DATA IN A LONGITUDINAL DIRECTION

(75) Inventors: Kuo-Kuang Keng, Hsinchu (TW); Wen-Cheng Ho, Shigang Shiang (TW); Jyh-Kai Chang, Sanchong (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 656 days.

(21) Appl. No.: 11/041,309

(22) Filed: Jan. 25, 2005

(65) Prior Publication Data
US 2005/0254715 A1  Nov. 17, 2005

(30) Foreign Application Priority Data
May 12, 2004  (TW) .............................. 93113318 A

(51) Int. Cl.
*G06K 9/36*  (2006.01)

(52) U.S. Cl. ...................... 382/233; 382/248; 382/250; 382/251

(58) Field of Classification Search ................ 382/232, 382/233, 166, 239, 250; 358/1.9, 515, 448, 358/530, 520, 296; 348/35; 375/E7.14, 375/E7.226
See application file for complete search history.

(56) References Cited

U.S. PATENT DOCUMENTS

| | | | | |
|---|---|---|---|---|
| 5,032,903 A | * | 7/1991 | Suzuki et al. | 358/530 |
| 5,187,570 A | * | 2/1993 | Hibi et al. | 358/520 |
| 5,220,440 A | * | 6/1993 | Hisatake | 382/239 |
| 5,343,312 A | * | 8/1994 | Hibi et al. | 358/520 |
| 5,715,329 A | * | 2/1998 | Murata | 382/166 |

FOREIGN PATENT DOCUMENTS

JP   406217287 A  *  8/1994

* cited by examiner

*Primary Examiner*—Anh Hong Do
(74) *Attorney, Agent, or Firm*—Bacon & Thomas, PLLC

(57) ABSTRACT

A block decoding method and system capable of decoding and outputting data in a longitudinal direction, which obtains a start address in an input compressed datastream for each block of a decompressed image by a pre-scanned compressed datastream such that the system can obtain 90°-rotated blocks by performing a Huffman decoding in a longitudinal direction, a 90°-rotated zigzag arrangement, an inverse quantization and an IDCT. Since the decoding direction is identical to the output direction of a printer, only a desired column of blocks of the decompressed image is temporarily stored for output and accordingly required memory size is relatively reduce.

28 Claims, 8 Drawing Sheets

| 61 | 55 | 56 | 62 | 77 | 92 | 101 | 99 |
|----|----|----|----|----|----|-----|-----|
| 51 | 60 | 69 | 80 | 103 | 113 | 120 | 103 |
| 40 | 58 | 57 | 87 | 109 | 104 | 121 | 100 |
| 24 | 26 | 40 | 51 | 68 | 81 | 103 | 112 |
| 16 | 19 | 24 | 29 | 56 | 64 | 87 | 98 |
| 10 | 14 | 16 | 22 | 37 | 55 | 78 | 95 |
| 11 | 12 | 13 | 17 | 22 | 35 | 64 | 92 |
| 16 | 12 | 14 | 14 | 18 | 24 | 39 | 72 |

FIG. 3 (PRIOR ART)

| 16 | 12 | 14 | 14 | 18 | 24 | 39 | 72 |
| 11 | 12 | 13 | 17 | 22 | 35 | 64 | 92 |
| 10 | 14 | 16 | 22 | 37 | 55 | 78 | 95 |
| 16 | 19 | 24 | 29 | 56 | 64 | 87 | 98 |
| 24 | 26 | 40 | 51 | 68 | 81 | 103 | 112 |
| 40 | 58 | 57 | 87 | 109 | 104 | 121 | 100 |
| 51 | 60 | 69 | 80 | 103 | 113 | 120 | 103 |
| 61 | 55 | 56 | 62 | 77 | 92 | 101 | 99 |

BLOCK DECODING METHOD AND SYSTEM CAPABLE OF DECODING AND OUTPUTTING DATA IN A LONGITUDINAL DIRECTION

BACKGROUND OF THE INVENTION

1. Field of the Invention

The invention relates to a block decoding method and system and, more particularly, to a block decoding method and system capable of decoding and outputting data in a longitudinal direction.

2. Description of Related Art

Block decoding is a known image compressing/decompressing technique. FIG. 1 is a block diagram of a well-known JPEG decoder 10. As shown, the JPEG decoder 10 is essentially constructed by a decoding device 110, a zigzag arranging device 120, an inverse quantizer 130, an inverse discrete cosine transform (IDCT) device 140, a color space converter 150 and a data buffer 160, thereby decoding a compressed datastream 100 in which a table 102 associated with compressed data 101 thereof is provided. The table 102 includes a Huffman coding table 111 and an quantization table 131 such that the decoding device 110 can perform a Huffman decoding on the compressed data 101 in accordance with the coding table 111 when the JPEG decoder 10 decodes the compressed datastream 101 to thus obtain a 1-D block consisting of 1-D arranged pixels. In accordance with the JPEG standard, the de-zigzag arranging device 120 recover the 1-D block into a 2-D block consisting of 2-D arranged pixels. As shown in FIG. 2, the arrows direct the zigzag sequence of pixel arrangement from the 1-D block to the 2-D block. Namely, the compressed pixels are arranged in a directional sequence of longitudinal (right), oblique (left lower), lower, oblique (right upper) and so on.

The de-quantizer 130 performs de-quantization on the 2-D block in accordance with the quantization table 131 to thus obtain a 2-D de-quantization block. FIG. 3 is an example of a content of the quantization table 131. The IDCT device 140 converts the 2-D de-quantization block from frequency domain to spatial domain. The color space converter 150 performs color conversion on the 2-D spatial block to thus convert its YCbCr format into a RGB format, thereby obtaining a decompressed image block similar to its source image.

The data buffer 160 provides with required memory for temporary data storage when processing of the Huffman decoding, the de-zigzag arrangement, the de-quantization and the IDCT.

As cited, the JPEG decoder 10 requires sequentially decoding the compressed datastream 100 first and then re-combines it into a complete decompressed image 200. For example, as to the decompressed image 200 represented by the smile face shown in FIG. 4, the JPEG decoder 10 sequentially decodes each block 41 in an A (horizontal) direction. However, when printing the decompressed image 200, a typical printer feeds paper in a B direction and fetches each block 41 of the decompressed image 200 in a C (longitudinal) direction. Accordingly, it is seen that the JPEG decoder 10 decodes the compressed datastream 100 for obtaining whole block 41 and storing them to the data buffer 160 first and then fetches the decompressed image 200 in the C direction for printing out. However, the data buffer 160 is increased with higher image resolution for storing more data. For an example of the decompressed image 200 with (M+1)×(N+1) blocks in FIG. 4, if every block requires 8×8×3 byte memory space, the JPEG decoder 10 requires a size of the data buffer 160 up to (M+1)×(N+1)×64×3 bytes, which needs very high hardware cost.

To overcome this, the U.S. Pat. No. 5,751,865 granted to Micco, et al. for a "Method and apparatus for image rotation with reduced memory using jpeg compression" discloses that in an encoding and compressing step, the image data is divided into blocks for pre-rotating operation in every block. Also, the location of each block in a JPEG file is recorded when encoding, and extracting the pre-rotated data when decoding. However, since such a process needs to rotate image in the compressing stage, a special compression format is introduced, which cannot support by standard JPEG decoder. In addition, since the JPEG file is rotated, only the longitudinal decoding can be performed, without a choice of decoding in a horizontal or longitudinal direction.

Further, the U.S. Pat. No. 6,298,166 granted to Ratnakar, et al. for an "Image transformations in the compressed domain" applies the standard JPEG encoding and also records additional information about compressed blocks for every compressed block. The additional information including indexes of the compressed blocks is not included in a standard JPEG compressed format but provided only for the special JPEG decoder. In accordance with the additional information, the special JPEG decoder can decode data in the longitudinal direction and output image according to the requirement of image rotation and mirror. Such a technique requires additional processes in encoding and compressing. Such a system is suitable for closed image input and output system because it need to teach longitudinal processing for an image output system. In addition, this patent discloses the processing of image mirror and rotation in frequency domain, not in spatial domain. Further, the processing of image mirror and rotation in frequency domain tends to a theoretical study, without an embodiment.

Therefore, it is desirable to provide an improved method to mitigate and/or obviate the aforementioned problems.

SUMMARY OF THE INVENTION

The object of the invention is to provide a block decoding method and system capable of decoding and outputting data in a longitudinal direction, which can save the size of data buffer and the required cost. Also, only a minor change for the JPEG decoder structure can have JPEG horizontal and longitudinal block decoding without using any special compression format and additional information.

In accordance with the first aspect of the present invention, there is provided a block decoding method capable of decoding and outputting data in a longitudinal direction. The method decodes an input compressed datastream to obtain a decompressed image with a plurality of blocks in rows and columns, each block consisting of pixels in a 2-D arrangement. The method includes the steps: a pre-scanning step, a decoding step, a de-zigzag arranging step, an de-quantizing step, and an inverse discrete cosine transform (IDCT) step. The pre-scanning step pre-scans the compressed datastream to thus obtain a start address in the compressed datastream for each block. The decoding step longitudinally performs a Huffman decoding on each block in accordance with its start address, thereby obtaining 1-D arrangement frequencies of each block. The de-zigzag arranging step arranges the frequencies of each block in a our predetermined sequence of lower, right upper, right and left lower, and repeats the sequence until the frequencies are arranged completely. The de-quantizing step performs an de-quantization on the frequencies of each block arranged in accordance with a rotated quantization table obtained by rotating an quantization table in 102 by 90 degrees. The IDCT step converts all blocks from frequency to spatial domain after the inverse quantization.

In accordance with the second aspect of the present invention, there is provided a block decoder capable of decoding and outputting data in a longitudinal direction which decodes an input compressed datastream to obtain a decompressed data with a plurality of blocks in rows and columns, each block consisting of pixels in a 2-D arrangement. The decoder includes a pre-scanning device, a decoding device, a de-zigzag arranging device, de-quantizer and an inverse discrete cosine transform (IDCT) device. The pre-scanning device receives the compressed datastream for pre-scan to thus obtain a start address in the compressed datastream for each block. The decoding device longitudinally performs a Huffman decoding on each block in accordance with its start address, thereby obtaining 1-D arrangement frequencies of each block. The de-zigzag arranging device is connected to the decoding device for arranging the frequencies of each block in our predetermined sequence of lower, right upper, right and left lower, and repeats the sequence until the frequencies are arranged completely. The de-quantizer is connected to the de-zigzag arranging device for performing an de-quantization on the frequencies of each block arranged in accordance with a rotated quantization table obtained by rotating an quantization table of the compressed datastream 102 by 90 degrees. The IDCT device is connected to the inverse quantizing device for converting all blocks from frequency to spatial domain after the inverse quantization.

In accordance with the third aspect of the present invention, there is provided a block decoding method capable of decoding and outputting data in a longitudinal direction. The method decodes an input compressed datastream to obtain a decompressed image with a plurality of blocks in rows and columns, each block consisting of pixels in a 2-D arrangement. The method includes the steps: a pre-scanning step, a decoding step, a de-zigzag arranging step, an de-quantizing step, and an inverse discrete cosine transform (IDCT) step. The pre-scanning step pre-scans the compressed datastream to thus obtain a start address in the compressed datastream for each block. The decoding step longitudinally performs a decoding on each block in accordance with its start address, thereby obtaining 1-D arrangement frequencies of each block. The de-zigzag arranging step arranges the frequencies of each block in our predetermined sequence. The de-quantizing step performs an de-quantization on the frequencies of each block arranged in accordance with a rotated quantization table obtained by rotating an quantization table of the compressed datastream in 102 by 90 degrees. The IDCT step converts all blocks from frequency to spatial domain after the inverse quantization.

In accordance with the fourth aspect of the present invention, there is provided a block decoder capable of decoding and outputting data in a longitudinal direction, which decodes an input compressed datastream to obtain a decompressed data with a plurality of blocks in rows and columns, each block consisting of pixels in a 2-D arrangement. The decoder includes a pre-scanning device, a decoding device, a de-zigzag arranging device, an de-quantizer and an inverse discrete cosine transform (IDCT) device. The pre-scanning device receives the compressed datastream for pre-scan to thus obtain a start address in the compressed datastream for each block. The decoding device longitudinally performs a decoding on each block in accordance with its start address, thereby obtaining 1-D arrangement frequencies of each block. The de-zigzag arranging device is connected to the decoding device for arranging the frequencies of each block in—our sequence. The de-quantizer is connected to the de-zigzag arranging device for performing an de-quantization on the frequencies of each block arranged in accordance with a rotated quantization table obtained by rotating an quantization table of the compressed datastream in 102 by 90 degrees. The IDCT device is connected to the inverse quantizing device for converting all blocks from frequency to spatial domain after the inverse quantization.

Other objects, advantages, and novel features of the invention will become more apparent from the following detailed description when taken in conjunction with the accompanying drawings.

BRIEF DESCRIPTION OF THE DRAWINGS

FIG. 3 is an example of an quantization table for a conventional JPEG;

DETAILED DESCRIPTION OF THE PREFERRED EMBODIMENT

Figure 5:
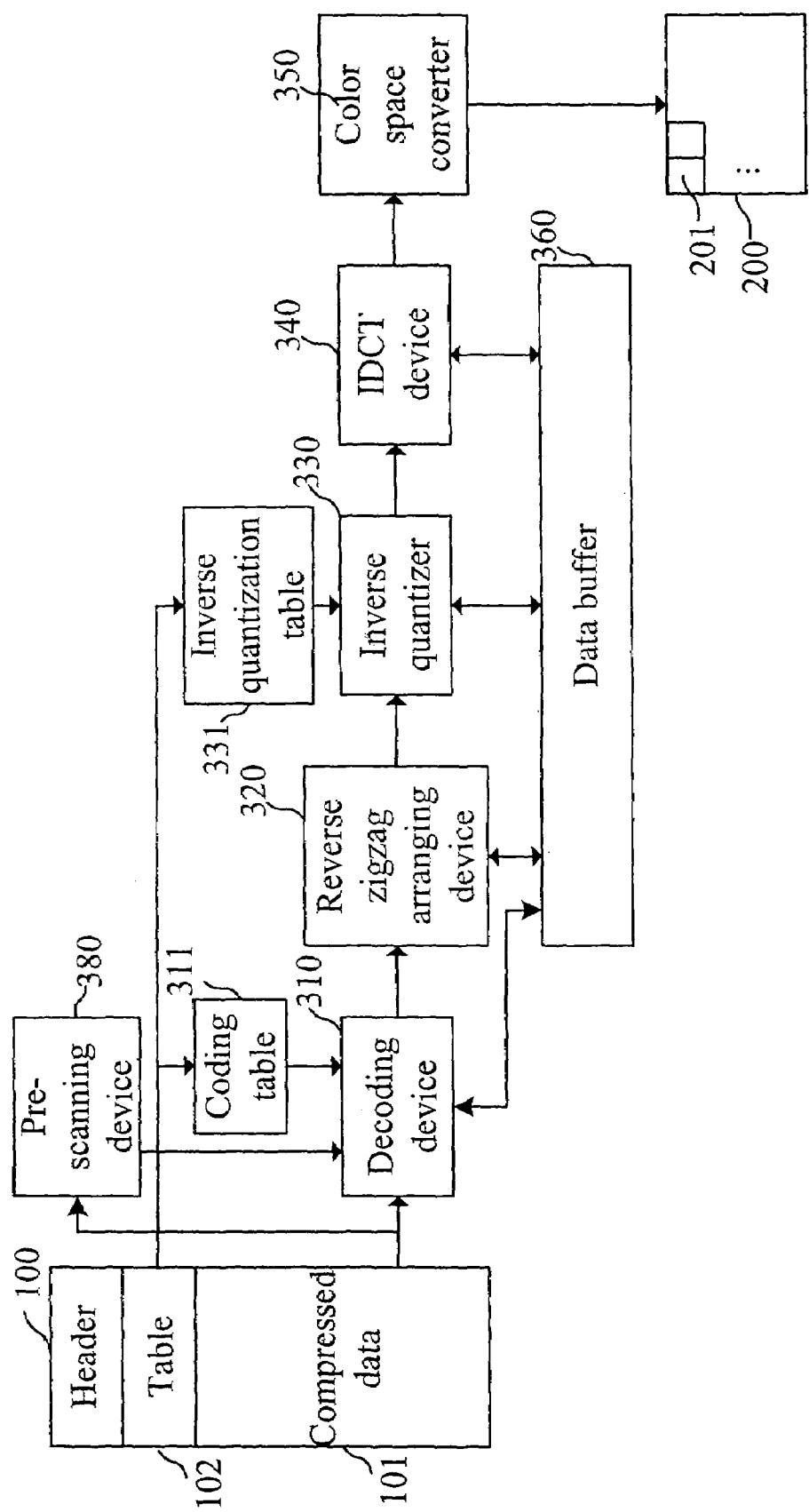
FIG. 5 is a block diagram of a block decoding system capable of decoding and outputting data in a longitudinal direction in accordance with the invention.

FIG. 5 is a block diagram of a block decoding system capable of decoding and outputting data in a longitudinal direction in accordance with the invention, where an example of JPEG decoding is given for description. In FIG. 5, the JPEG decoding is applied to decode an input compressed datastream 100 for obtaining a decompressed image 200 having a plurality of blocks 201. The blocks 201 are arranged in a 2-D array, where a block (i, j) indicates a block of i-th row and j-th column of the decompressed image 200, for i=0~M, j=0~N, and M, N are integers. The compressed datastream 100 has a table 102 associated with compressed data 101 thereof. The table 102 has a Huffman coding table 311 and an quantization table 331. As shown, the decoding system includes a pre-scanning device 380, a decoding device 310, a de-zigzag arranging device 320, an de-quantizer 330, an inverse discrete cosine transform (IDCT) device 340, a color space converter 350, and a data buffer 360.

Figure 1:
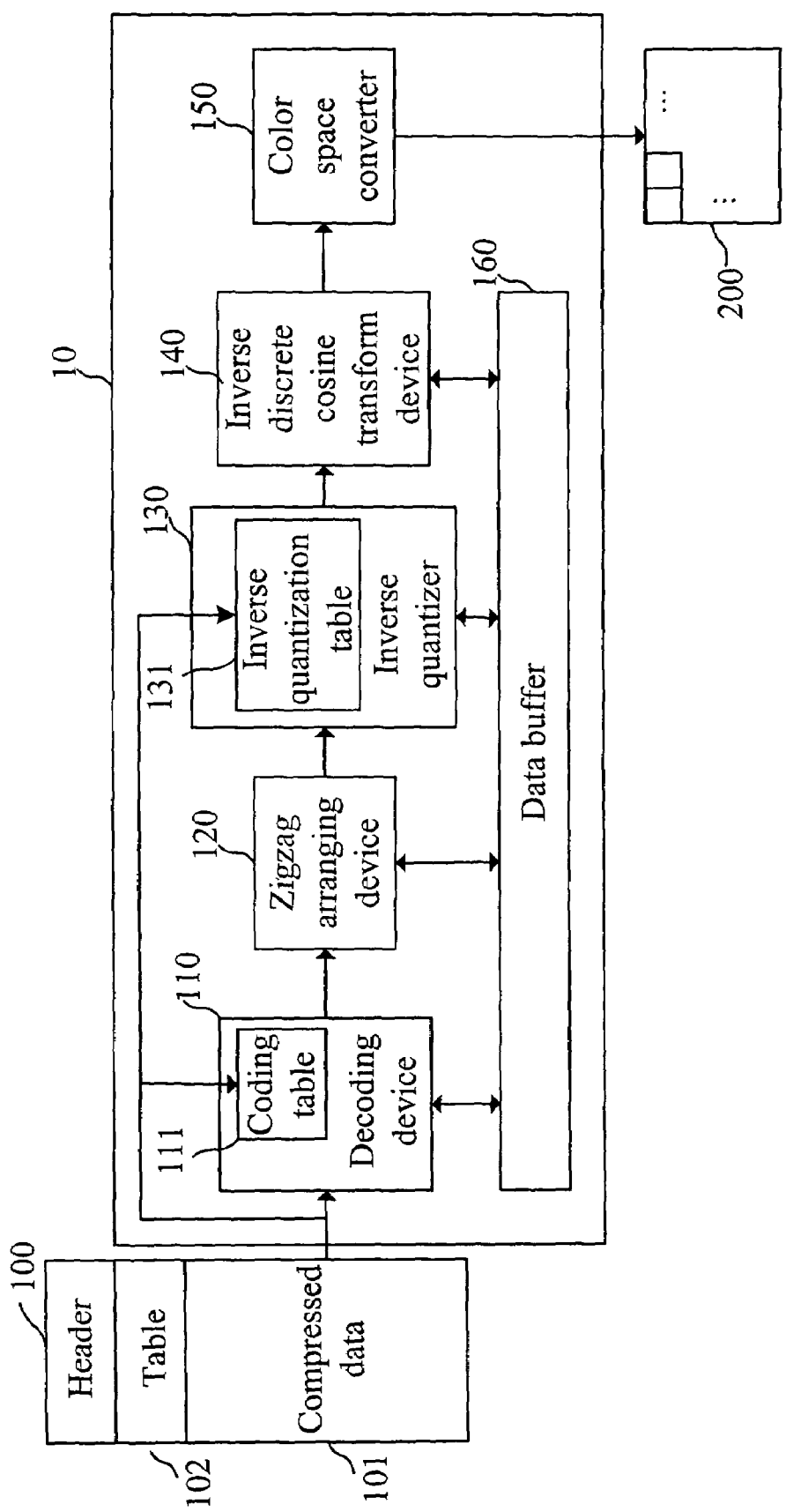
FIG. 1 is a block diagram of a conventional JPEG decoder.
Figure 6:
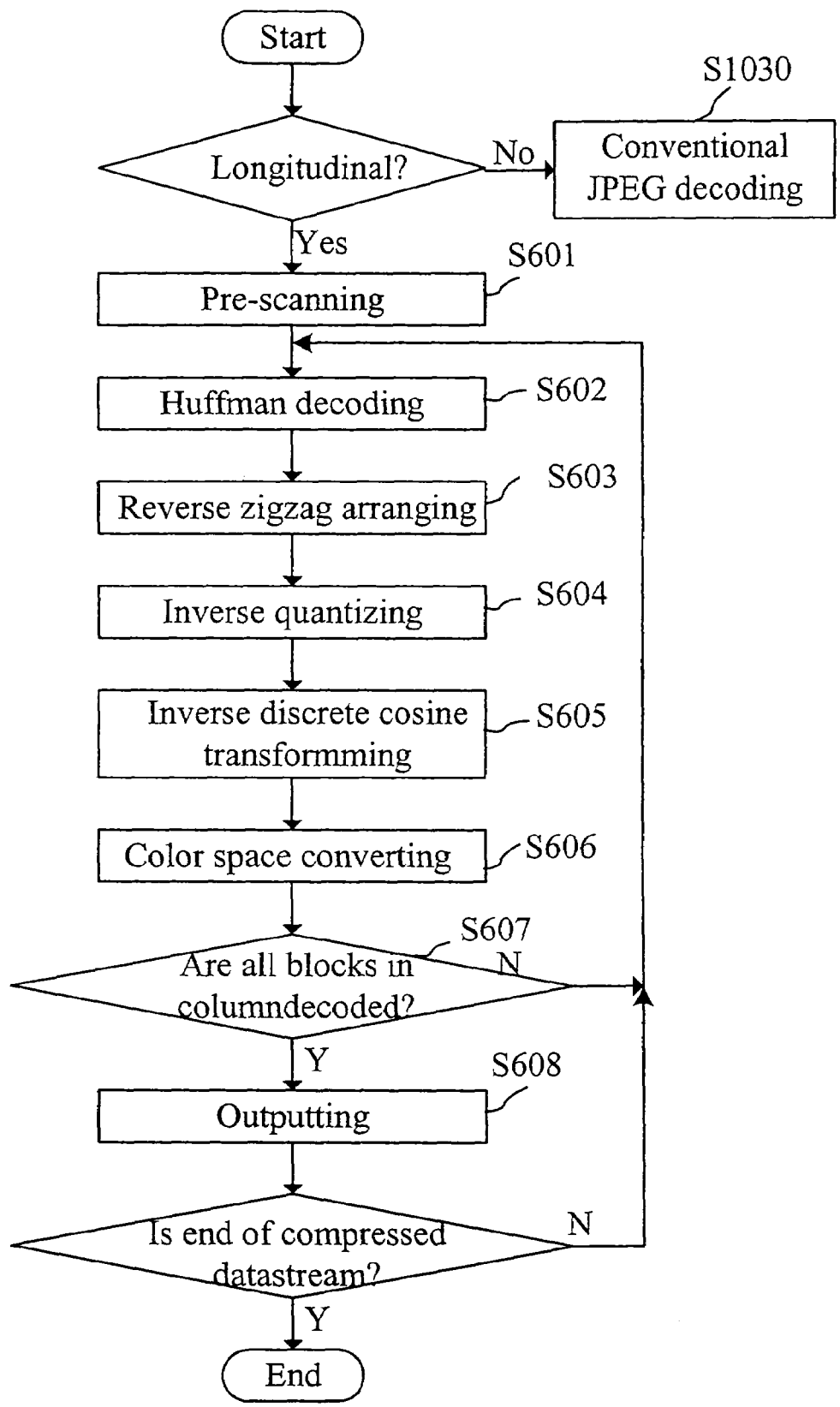
FIG. 6 is a flowchart of a block decoding method capable of decoding and outputting data in a longitudinal direction in accordance with the invention.

FIG. 6 is a flowchart of a block decoding method capable of decoding and outputting data in a longitudinal direction in accordance with the invention. Referring to FIGS. 5 and 6, when the compressed datastream decoded intents to output in a horizontal direction, the devices 310, 320, 330, 340, 350 and 360 can be operated as the prior JPEG decoder shown in FIG. 1. Thus, the inventive block decoding system can typically decode and output the compressed datastream in a horizontal direction. However, when the datastream intents to output in a longitudinal direction, the pre-scanning device 380 perform a pre-scan on the compressed datastream 100, thereby obtaining a start address in the compressed datastream 100 for each block (i, j) of the decompressed image 200 (step S601).

The pre-scanning device 380 performs a Huffman decoding on the compressed datastream 100, thereby obtaining start addresses in the compressed datastream 100 for a first column of blocks of the decompressed image 200. Namely, start addresses respectively of blocks (0, 0), (1, 0), . . . , (M, 0) in the compressed image 100 are obtained. A size of each block cited above is also obtained by the pre-scan. Accordingly, the starts addresses and sizes respectively of the remaining blocks in the compressed image 100 are subsequently obtained. For example, a start address of block (0, 1) in the compressed datastream 100 equals to the start address of block (0, 0) plus its size, a start address of block (0, 2) in the compressed datastream 100 equals to the start address of block (0, 1) plus its size, and the like. Thus, a start address of block (i, j) in the compressed datastream 100 can be obtained.

The decoding device 310 receives the compressed datastream 100 and performs the Huffman decoding on block (i, j) in a longitudinal (column) direction in accordance with a coding table 311 and the start address of block (i, j) obtained by the pre-scanning device 380 (step 602), thereby obtaining 1-D arrangement frequencies of block (i, j). In step 602, since the start address of block (i, j) in the compressed datastream 100 is known, the longitudinal decoding can be achieved by selecting values of i and j for the start address of block (i, j). Namely, the compressed datastream 100 is decoded by a sequence of the $0^{th}$ column of blocks (i, 0), the first column of blocks (i, 1), the second column of blocks (i, 2), . . . , the j-th column of blocks (i, j), where i=0 to M, j=0 to N.

Figure 2:
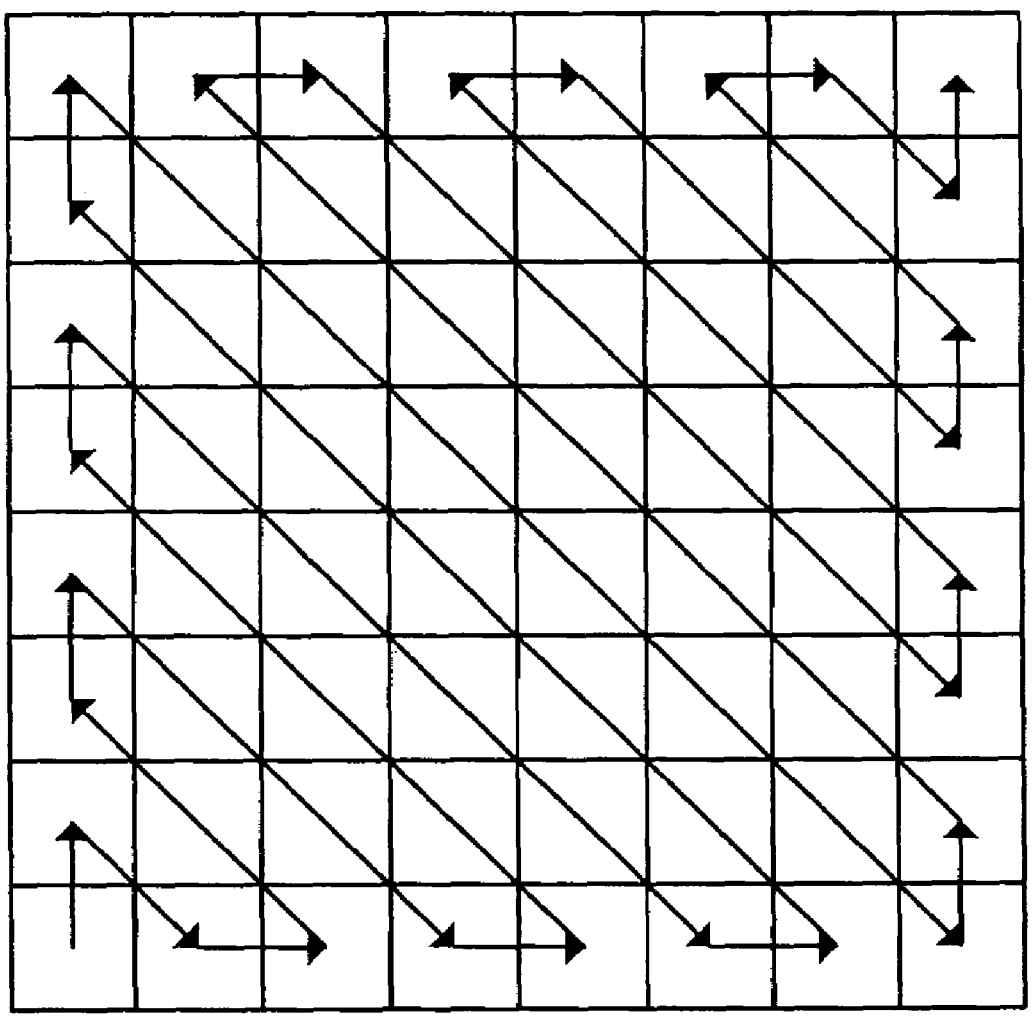
FIG. 2 is a diagram of a zigzag arrangement sequence in a conventional JPEG.
Figure 4:
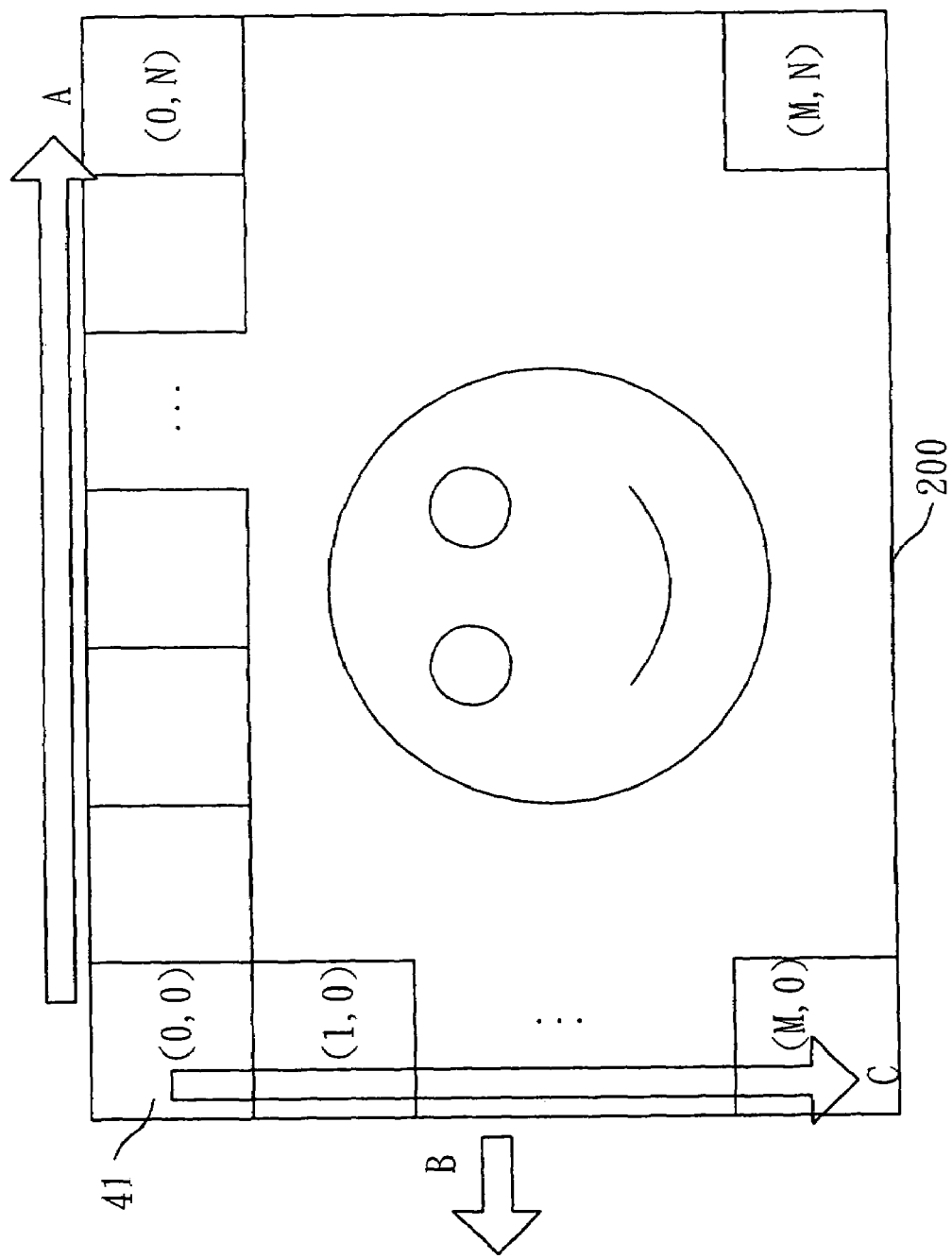
FIG. 4 is a graph of a typical decompressed image.
Figures 7, 8:
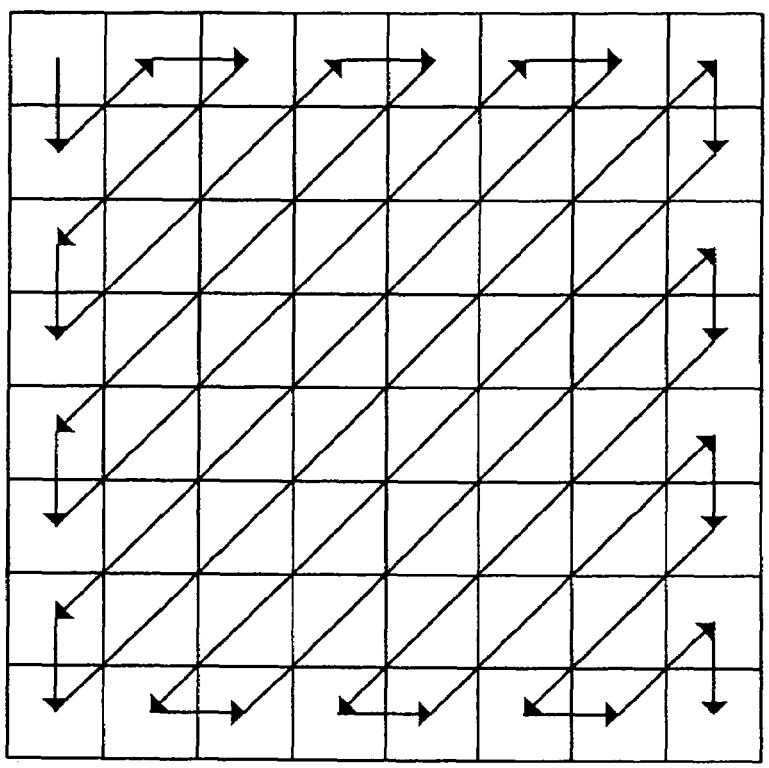
FIG. 7 shows a zigzag arrangement sequence in accordance with the invention.
FIG. 8 shows a 90 degree-rotated quantization table in accordance with the invention.

The de-zigzag arranging device 320 is connected to the decoding device 310 for arranging the frequencies of block (i, j) in accordance with a predetermined sequence(step S603). FIG. 7 shows a predetermined sequence in accordance with the invention, which has a repeatedly arranged sequence of lower, right upper, right, left lower that is different from a typical JPEG zigzag arrangement of FIG. 2.

The de-quantizer 330 is connected to the de-zigzag arranging device 320 for rotating the quantization table 331 by 90 degrees (as shown in FIG. 8) to form a 90 degree-rotated quantization table. The 90 degree-rotated quantization table is applied to the 2-D block (i, j) for performing de-quantization, thereby obtaining a 2-D de-quantization block (i, j) (step S604).

The IDCT device 340 is connected to the de-quantizer 330 for converting the 2-D de-quantization block (i, j) from frequency domain to spatial domain (step S605).

In accordance with the JPEG standard, coefficients on spatial domain can be obtained by applying an inverse discrete cosine transform on frequency coefficients. Thus, all coefficients A(x,y) on spatial domain block for each block (i, j) can be represented as follows.

$$A(x, y) = IDCT[f(m, n)] = \sum_{n=0}^{8-1}\sum_{m=0}^{8-1} f(m, n)\cos\left(\frac{(2m+1)\pi}{2\times 8}\times x\right)\cos\left(\frac{(2n+1)\pi}{2\times 8}\times y\right), \quad (1)$$

where f(m,n) indicates coefficients on frequency domain.

The coefficients A(x,y) can be an 8×8 matrix [A(x,y)]. The matrix [A(x,y)] has a transpose matrix represented by $[A(x, y)]^T$=[A(y,x)], thus all coefficients A(y,x) on spatial domain block for each block (i, j) can be represented as follows.

$$A(y, x) = \sum_{n=0}^{8-1}\sum_{m=0}^{8-1} f(m, n)\cos\left(\frac{(2m+1)\pi}{2\times 8}\times y\right)\cos\left(\frac{(2n+1)\pi}{2\times 8}\times x\right), \quad (2)$$

where f(m,n) indicates coefficients on frequency domain. When m, n are exchanged, the equation (2) becomes the following equation.

$$A(y, x) = \sum_{n=0}^{8-1}\sum_{m=0}^{8-1} f(m, n)\cos\left(\frac{(2n+1)\pi}{2\times 8}\times y\right)\cos\left(\frac{(2m+1)\pi}{2\times 8}\times x\right) = \quad (3)$$

$$IDCT[f(n, m)],$$

where f(n,m) indicates coefficients on frequency domain. As comparing equation (1) and equation (3), it is known that a rotated spatial matrix can be obtained by rotating a frequency matrix and performing the IDCT on the frequency matrix rotated. Thus, the 2-D block (i, j) generated by the predetermined de-zigzag arrangement and rotated 90 quantization table is rotated 90 degrees after the IDCT performance.

The color space converter 350 is connected to the IDCT device 340 for performing color conversion from a YcbCr format to a RGB format on the 2-D spatial block (i, j), thereby generating each block (i, j) of the decompressed image similar to the source image (step S606).

Step 607 determines if blocks of a current column are decoded completely; if no, steps S602 to S606 are repeated; if yes, the decoded blocks of the column are outputted (step 608), and the procedure starts to decode a next column of blocks until no more column of blocks to be decoded.

Figure 9:
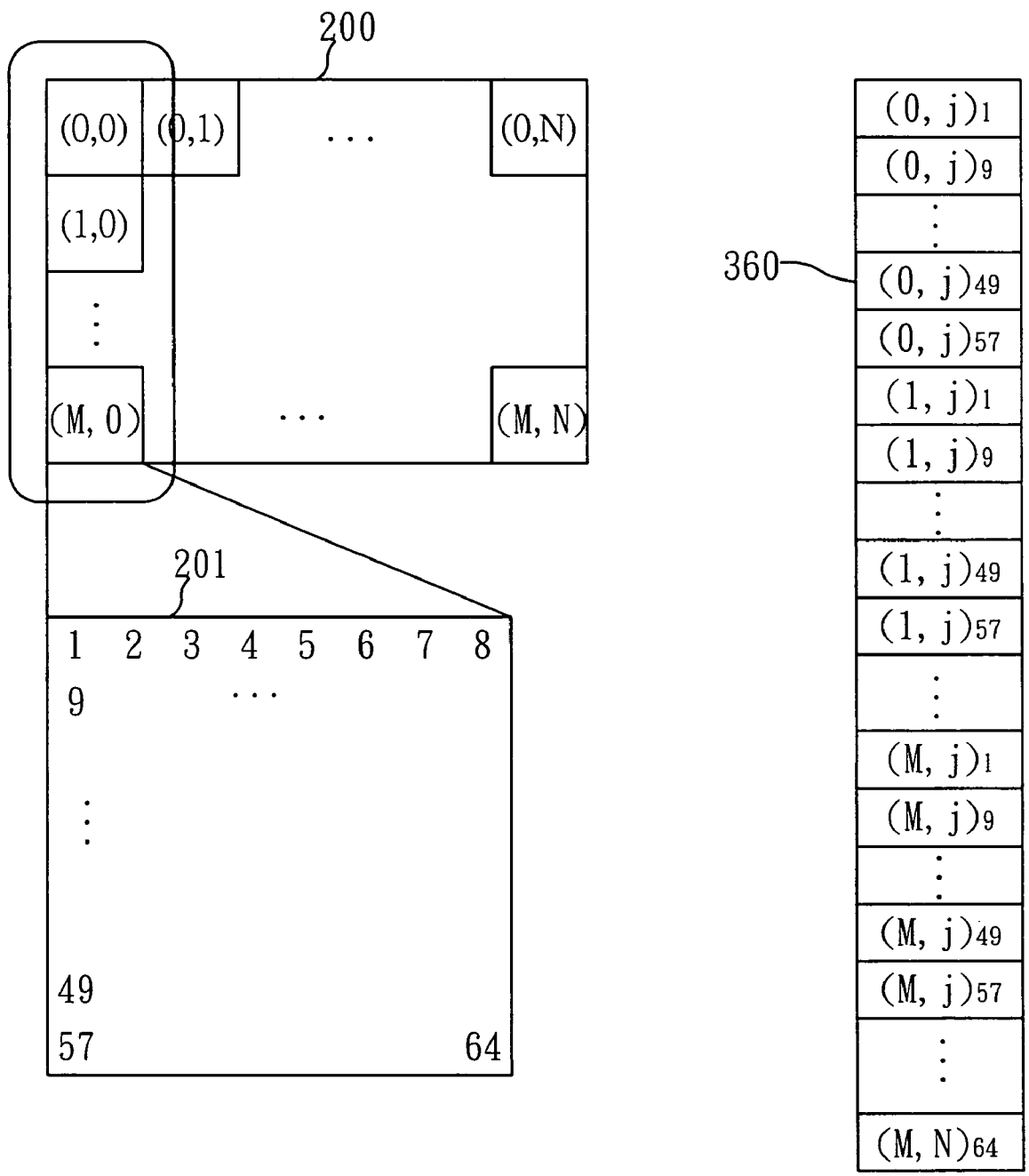
FIG. 9 is a schematic view of using a data buffer to temporarily store all blocks of a decompressed image in accordance with the invention.

The data buffer 360 provides with temporary storage to the cited processes of Huffman decoding, the de-zigzag arrangement, the de-quantization and the IDCT. FIG. 9 is a schematic diagram of applying the data buffer 360 to temporarily store each block (i, j) of the decompressed image 200 in accordance with the invention, which each block (i, j) has 64 pixels (numbered 1 to 64). Accordingly, the data buffer 360 requires only temporarily storing one column of blocks of the decompressed image 200 for output, thus only a buffer size of (M+1)×1×64×3 bytes is required to temporarily store a j-th column of blocks of the decompressed image 200.

In view of the foregoing, it is known that the invention uses the pre-scanned compressed datastream to obtain a respective start address in the compressed image for each block of the decompressed image, such that the decoder can perform the Huffman decoding on the blocks in a longitudinal direction. Subsequently, the blocks decoded are subjected to the de-zigzag arrangement, the de-quantization and the IDCT for obtaining 90°-rotated blocks. Since the 90°-rotated blocks have an identical direction on decoding and printing, only a desired column of blocks of the decompressed image is temporarily stored for output and accordingly required memory size is relatively reduce. In addition, since the format of the compressed datastream processed meets with the JPEG standard, as well as the decoding process is compatible with the JPEG standard, the invention can combine with the conventional JPEG decoder to thus achieve the capability of supporting longitudinal and horizontal decoding.

Although the present invention has been explained in relation to its preferred embodiment, it is to be understood that many other possible modifications and variations can be made without departing from the spirit and scope of the invention as hereinafter claimed.

What is claimed is:

1. A block decoding method capable of decoding and outputting data in a longitudinal direction, which decodes an input compressed datastream to obtain a decompressed image with a plurality of blocks in rows and columns, each block consisting of pixels in a 2-D arrangement, the method comprising the steps:

a pre-scanning step, which pre-scans the compressed datastream to thus obtain a start address of each block in the compressed datastream;

a decoding step, which longitudinally performs a Huffman decoding on each block in accordance with its start address, thereby obtaining 1-D arrangement frequencies of each block;

a reverse zigzag arranging step, which arranges the frequencies of each block in a reverse zigzag sequence of lower, right upper, right and left lower, and repeats the sequence until the frequencies are arranged completely;

an inverse quantizing step, which performs an inverse quantization on the frequencies of each block arranged in accordance with a rotated inverse quantization table obtained by rotating an inverse quantization table of the compressed datastream by 90 degrees; and an inverse discrete cosine transform (IDCT) step, which converts all blocks from frequency to spatial domain after the inverse quantization, thereby obtaining spatial blocks.

2. The method as claimed in claim 1, wherein the decoding step, the reverse zigzag arranging step, the inverse quantizing step and the IDCT step are repeated until all blocks of the compressed datastream are longitudinally decoded completely.

3. The method as claimed in claim 2, further comprising a color space converting step to perform a color conversion on the 2-D spatial blocks.

4. The method as claimed in claim 3, wherein the color conversion converts the 2-D spatial blocks from YCbCr to RGB.

5. The method as claimed in claim 1, wherein the compressed datastream is generated by compression in accordance with a JPEG standard.

6. The method as claimed in claim 1, wherein the pre-scanning step further comprises:

performing a Huffman decoding on the compressed datastream to thus obtaining start addresses in the compressed datastream for a first column of blocks of the decompressed image;

finding a size of each block in the compressed data stream; and calculating start addresses in the compressed datastream for remaining blocks of the decompressed image in accordance with the start address and size of each block of the first column.

7. A block decoder capable of decoding and outputting data in a longitudinal direction, which decodes an input compressed datastream to obtain a decompressed data with a plurality of blocks in rows and columns, each block consisting of pixels in a 2-D arrangement, the decoder comprising:

a pre-scanning device, which receives the compressed datastream for pre-scan to thus obtain a start address of each block in the compressed datastream;

a decoding device, which longitudinally performs a Huffman decoding on each block in accordance with its start address, thereby obtaining 1-D arrangement frequencies of each block;

a reverse zigzag arranging device, which is connected to the decoding device for arranging the frequencies of each block in a reverse zigzag sequence of lower, right upper, right and left lower, and repeats the sequence until the frequencies are arranged completely;

an inverse quantizer is connected to the reverse zigzag arranging device for performing an inverse quantization on the frequencies of each block arranged in accordance with a rotated inverse quantization table obtained by rotating an inverse quantization table of the compressed datastream by 90 degrees; and an IDCT device, which is connected to the inverse quantizing device for converting all blocks from frequency to spatial domain after the inverse quantization, thereby obtaining spatial blocks.

8. The decoder as claimed in claim 7, further comprising:

a data buffer, which is connected to the decoding device, the zigzag device, the inverse quantizer and the inverse cosine device for providing with temporary storage.

9. The decoder as claimed in claim 8, further comprising:

a color space converter, which is connected to the IDCT device for performing color conversion on the 2-D spatial blocks.

10. The decoder as claimed in claim 9, wherein the color conversion converts the 2-D spatial blocks from YCbCr to RGB.

11. The decoder as claimed in claim 7, wherein the compressed datastream is generated by compression in accordance with a JPEG standard.

12. The decoder as claimed in claim 7, wherein the pre-scanning device firstly performs a Huffman decoding on the compressed datastream to thus obtaining start addresses in the compressed datastream for a first column of blocks of the decompressed image, then finding a size of each block in the compressed data stream, and finally calculating start addresses in the compressed datastream for remaining blocks of the decompressed image in accordance with the start address and size of each block of the first column.

13. A block decoding method capable of decoding and outputting data in a longitudinal direction, which decodes an input compressed datastream to obtain a decompressed data with a plurality of blocks in rows and columns, each block consisting of pixels in a 2-D arrangement, the method comprising the steps:

a pre-scanning step, which pre-scans the compressed datastream to thus obtain a start address of each block in the compressed datastream;

a decoding step, which longitudinally performs a decoding on each block in accordance with its start address, thereby obtaining 1-D arrangement frequencies of each block;

a reverse zigzag arranging step, which arranges the frequencies of each block in a reverse zigzag sequence;

an inverse quantizing step, which performs an inverse quantization on the frequencies of each block arranged in accordance with a rotated inverse quantization table obtained by rotating an inverse quantization table of the compressed datastream by 90 degrees; and an IDCT step converts all blocks from frequency to spatial domain after the inverse quantization.

14. The method as claimed in claim 13, wherein the decoding step, the reverse zigzag arranging step, the inverse quantizing step and the IDCT step are repeated until all blocks of the compressed datastream are longitudinally decoded completely.

15. The method as claimed in claim 14, further comprising a color space converting step to perform a color conversion on the 2-D spatial blocks.

16. The method as claimed in claim 15, wherein the color conversion converts the 2-D spatial blocks from YCbCr to RGB.

17. The method as claimed in claim 13, wherein the compressed datastream is generated by compression in accordance with a JPEG standard.

18. The method as claimed in claim 13, wherein the pre-scanning step further comprises:
   performing a Huffman decoding on the compressed datastream to thus obtaining start addresses in the compressed datastream for a first column of blocks of the decompressed image;
   finding a size of each block in the compressed data stream; and
   calculating start addresses in the compressed datastream for remaining blocks of the decompressed image in accordance with the start address and size of each block of the first column.

19. The method as claimed in claim 13, wherein the reverse zigzag sequence is a sequence of lower, right upper, right, left lower, which is repeated until the frequencies are arranged completely.

20. The method as claimed in claim 13, wherein the decoding step longitudinally performs a Huffman decoding on each block in accordance with its start address, thereby obtaining all frequencies of each block.

21. A block decoder capable of decoding and outputting data in a longitudinal direction, which decodes an input compressed datastream to obtain a decompressed data with a plurality of blocks in rows and columns, each block consisting of pixels in a 2-D arrangement, the decoder comprising:
   a pre-scanning device, which receives the compressed datastream for pre-scan to thus obtain a start address of each block in the compressed datastream;
   a decoding device, which longitudinally performs a decoding on each block in accordance with its start address, thereby obtaining 1-D arrangement frequencies of each block;
   a reverse zigzag arranging device, which is connected to the decoding device for arranging the frequencies of each block in a reverse zigzag sequence;
   an inverse quantizer, which is connected to the reverse zigzag arranging device for performing an inverse quantization on the frequencies of each block arranged in accordance with a rotated inverse quantization table obtained by rotating an inverse quantization table of the compressed datastream by 90 degrees; and
   an IDCT device, which is connected to the inverse quantizing device for converting all blocks from frequency to spatial domain after the inverse quantization, thereby obtaining 2-D spatial blocks.

22. The decoder as claimed in claim 21, further comprising:
   a data buffer, which is connected to the decoding device, the zigzag device, the inverse quantizer and the inverse cosine device for providing with temporary storage.

23. The decoder as claimed in claim 22, further comprising:
   a color space converter, which is connected to the IDCT device for performing color conversion on the 2-D spatial blocks.

24. The decoder as claimed in claim 23, wherein the color conversion converts the 2-D spatial blocks from YCbCr to RGB.

25. The decoder as claimed in claim 21, wherein the compressed datastream is generated by compression in accordance with a JPEG standard.

26. The decoder as claimed in claim 21, wherein the pre-scanning device firstly performs a Huffman decoding on the compressed datastream to thus obtaining start addresses in the compressed datastream for a first column of blocks of the decompressed image, then finding a size of each block in the compressed data stream, and finally calculating start addresses in the compressed datastream for remaining blocks of the decompressed image in accordance with the start address and size of each block of the first column.

27. The decoder as claimed in claim 21, wherein the reverse zigzag sequence is a sequence of lower, right upper, right, left lower, which is repeated until the frequencies are arranged completely.

28. The decoder as claimed in claim 21, wherein the decoding step longitudinally performs a Huffman decoding on each block in accordance with its start address, thereby obtaining all frequencies of each block.

* * * * *